Jan. 27, 1942.　　　T. JACKSON　　　2,271,015
TWO-STROKE CYCLE ENGINE INDUCTION SYSTEM
Filed July 24, 1940
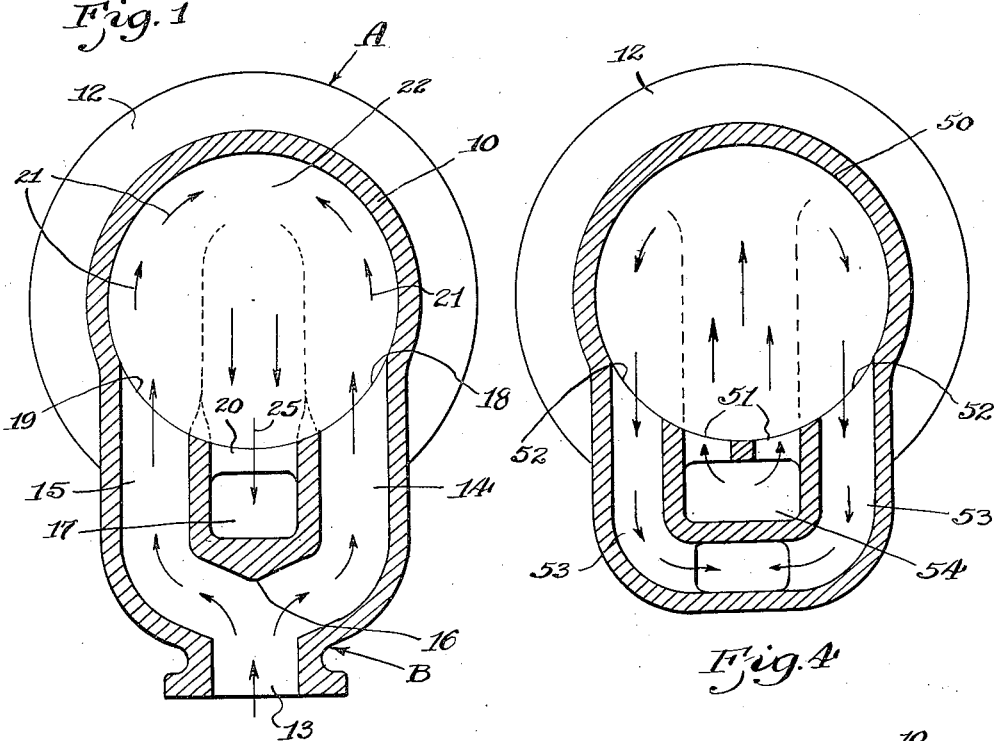
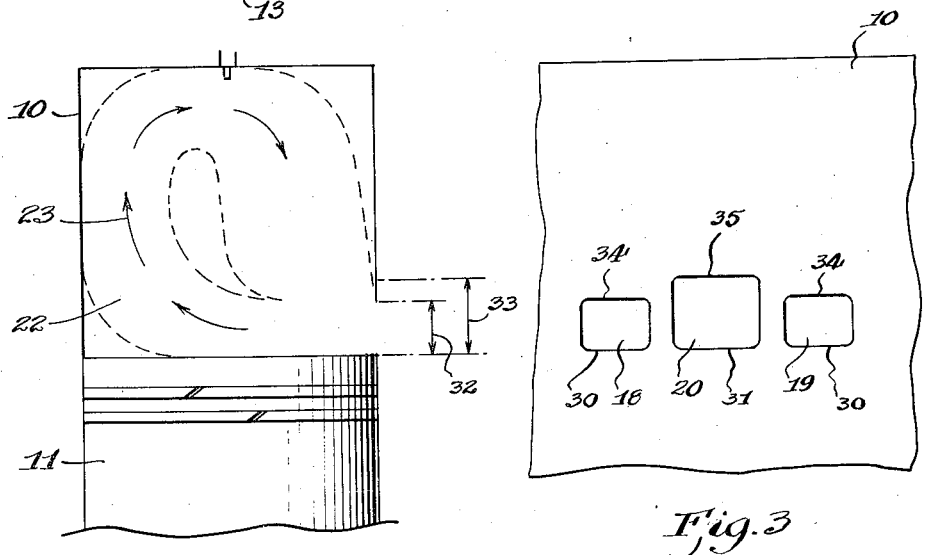
INVENTOR.
Thomas Jackson
BY
ATTORNEY Patented Jan. 27, 1942

2,271,015

UNITED STATES PATENT OFFICE 2,271,015

TWO-STROKE CYCLE ENGINE INDUCTION SYSTEM

Thomas Jackson, Kokomo, Ind., assignor to Continental Motors Corporation, Detriot, Mich., a corporation of Virginia Application July 24, 1940, Serial No. 347,208

7 Claims. (Cl. 123—65)

My invention relates to engines, and more particularly, to an induction system for a two-stroke cycle internal combustion engine.

Much difficulty is had in scavenging a two-stroke cycle engine, and it is customary in many instances, to provide baffles on the top face of the piston or arrange the intake and exhaust ports diametrically opposite to each other in order to avoid, as much as possible, the intermingling of the intake gases with the exhaust gases as they are being respectively introduced and exhausted from the engine cylinder. Heretofore, it has not been possible to obtain practical cylinder scavenging with the use of a flat top piston.

An object of my present invention is to construct an improved two-stroke cycle engine by providing an induction system, which is constructed and arranged to introduce loop scavenging with the same timing of the intake and exhaust cyclical events as is had with two-stroke cycle engines provided with transverse cylinder scavenging.

Another object of my present invention is to construct an improved two-stroke cycle engine, which is operable to obtain a maximum of exhaust gas scavenging with a minimum of intermingling of the intake gases with the exhaust gases as the same are being respectively introduced and exhausted from the engine cylinder by providing intake and exhaust port means constructed and arranged on the same side of the engine cylinder and to introduce substantially parallel flow of said intake and exhaust gases.

A further object of my present invention is to construct an improved two-stroke cycle internal combustion engine by providing an induction system which divides the incoming gases and introduces same through intake ports located on each side of the exhaust port, and which are arranged to introduce the intake gases substantially tangentially with respect to the engine cylinder, and so arranged as to direct the flow of intake gases in a pre-determined path resulting in a minimum intermingling of same with the exhaust gases and promoting loop scavenging of the engine cylinder.

Further objects of my present invention relate to various structural details of the induction system and its relation to the exhaust passage, all of which details and features cooperate to produce the advantageous results which are obtained by my improved two-stroke cycle engine. For a more detailed understanding of my invention, reference may be had to the accompanying drawing illustrating preferred embodiments of my invention, and in which:

Fig. 1 is a transverse sectional view through a two-stroke cycle internal combustion engine taken substantially in a plane extending normal to the cylinder axis, Fig. 2 is a diagrammatic transverse sectional view through an engine cylinder and showing the piston in a lowermost position and diagrammatically showing by dotted lines the loop scavenging of the engine cylinder, Fig. 3 is a fragmentary detail view illustrating a developed length of the cylinder and showing the preferred arrangement of the intake and exhaust ports, and Fig. 4 is a horizontal sectional view showing a modified construction and taken in a plane extending substantially normal to the cylinder axis.

The two-stroke cycle engine A illustrated in the accompanying drawing is in general of substantially conventional construction and comprises a cylinder 10 in which a piston 11 is operable. The cylinder may be cooled by any suitable manner and I have preferably shown same as being provided with cooling fins 12. The intake and exhaust means preferably comprise suitable intake and exhaust ports which are uncovered by the piston as the same moves to its lowermost position, said piston thereby cooperating with the intake and exhaust ports to control the engine cyclical events.

The above mentioned induction system preferably comprises a structure B including a primary intake conduit or conducting passage 13 and branch passages or conducting portions 14 and 15 separated preferably by a split 16. These branches 14 and 15 preferably substantially surround the exhaust passage 17 and terminate in intake ports 18 and 19 located on each side of the central exhaust port 20. It will be observed that the intake ports 18 and 19 are located closely adjacent to the exhaust port 20 and said intake and exhaust ports are all located on the same side of the engine cylinder. The intake gases are induced to flow in a direction as indicated by arrows 21 and it will be noted that these intake gases are introduced substantially tangentially into the engine cylinder 10, same being caused to meet in the region designated 22 and thence caused to flow outwardly of the engine cylinder as indicated by the arrows 23 shown in Fig. 2. This travel of the incoming gases assumes a path as diagrammatically illustrated in Fig. 3 which is termed a loop and thus the burned gases are forced to that region of the engine cylinder adjacent the cylinder center axis and exhausted through exhaust port 20 in a direction as indicated by the arrow 25.

It will thus be observed that the incoming gases are induced to flow in a path substantially parallel to the flow of the exhaust gases, when same are being respectively introduced and exhausted from the engine cylinder with a minimum of intermingling of said exhaust and intake gases. Furthermore, it will be observed that the incoming gases have a maximum cooling effect on the exhaust gases within the cylinder proper as well as in the exhaust passage 17.

It will be noted that the lower port edges 30 of the intake ports 18 and 19 lie substantially in the same transverse engine plane, which extends normal to the cylinder axis and contains the lower port edge of the exhaust port 20. The height of the intake ports indicated in Fig. 2 at 32 is less than the height of the exhaust port as indicated at 33, and therefore, the upper port edges 34 of the intake ports are spaced axially of the cylinder from the upper port edge 35 of the exhaust port 20.

In the operation of the engine the piston 11 first uncovers the exhaust port 20 as the piston is moved towards its lowermost position. Because of the construction of the ports and the arrangement which introduces flow of the intake gases tangentially of the cylinder with a minimum intermingling with the exhaust gases, the same timing of engine cyclical events, as is had with transverse cylinder scavenging, may be incorporated as a feature of my present construction, and thus the intake ports are arranged to be opened very soon after the opening of the exhaust port, thereby effecting an efficient scavenging of the engine cylinder.

It will be noted that the directional effect imparted to the incoming gases tends to minimize intermingling of the incoming gases with the exhaust gases and also facilitates perfect loop scavenging enabling one to obtain the advantageous results of loop scavenging without the disadvantage of having to vary the timing of the engine cycle events, as the present construction preserves the advantages of timing of engine cycle events which is had with transverse cylinder scavenging.

In Fig. 4, I have illustrated a modified construction, and have shown an engine cylinder 50 provided with a pair of central intake ports 51 and exhaust ports 52 located on each side of the intake port means. This modified construction is substantially the opposite to that illustrated in Fig. 1 and it will be noted that the branched exhaust passage 53 here surrounds the intake chamber or passage 54. In this construction the intake and exhaust gases are confined to flow in substantially parallel paths as the same are respectively introduced and exhausted from the engine cylinder. This construction is operable to obtain a minimum of intermingling of the intake gases with the exhaust gases, but does not provide for the maximum of cooling for the exhaust gases as is had with the preferred construction illustrated in Figs. 1 to 3 inclusive.

Although I have illustrated but one form of my invention and have described in detail but a single application thereof, it will be apparent to those skilled in the art to which my invention pertains, that various modifications and changes may be made therein without departing from the spirit of my invention or from the scope of the appended claims.

I claim:

1. An induction system for a two-stroke cycle internal combustion engine having a cylinder and a substantially flat top piston operable in said cylinder, said top face of the piston extending normal to the cylinder axis, intake and exhaust means for said cylinder and comprising closely adjacent intake and exhaust ports located on the same side of said engine cylinder and comprising intake and exhaust passages extending normal to the cylinder axis, said intake and exhaust ports constructed and arranged to induce substantially parallel flow of said intake and exhaust gases in a plane substantially parallel to the piston top face with a minimum of intermingling of said intake and exhaust gases as same are being respectively introduced and exhausted from said engine cylinder.

2. An induction system for a two-stroke cycle internal combustion engine having a cylinder and a substantially flat top piston operable in said cylinder, said top face of the piston extending normal to the cylinder axis, intake and exhaust means for said cylinder and comprising closely adjacent intake and exhaust ports located on the same side of said engine cylinder and comprising intake and exhaust passages extending normal to the cylinder axis, said intake and exhaust ports constructed and arranged to promote loop scavenging of said engine cylinder and to confine the flow of said intake and exhaust gases in substantially parallel paths in a plane substantially parallel to the piston top face as same are being respectively introduced and exhausted from said engine cylinder with a minimum of intermingling of said intake and exhaust gases.

3. An induction system for a two-stroke cycle internal combustion engine having a cylinder and a substantially flat top piston operable in said cylinder, intake and exhaust means for said cylinder and comprising closely adjacent intake and exhaust ports located on the same side of said engine cylinder, said intake and exhaust ports constructed and arranged to promote loop scavenging of said engine cylinder and to confine the flow of said intake and exhaust gases in substantially parallel paths in a common plane extending substantially parallel to the piston top face as same are being respectively introduced and exhausted from said engine cylinder with a minimum of intermingling of said intake and exhaust gases, said intake port means having top edges spaced axially of the cylinder from the top edges of said exhaust port means, and cooperating with the piston to control the engine cyclical events.

4. An induction system for a two-stroke cycle internal combustion engine having a cylinder and a substantially flat top piston operable in said cylinder, intake and exhaust means for said cylinder and comprising closely adjacent intake and exhaust ports located on the same side of said engine cylinder and intake and exhaust conduits respectively connected with the said ports, said intake and exhaust ports constructed and arranged in cooperative relation with said conduits to promote loop scavenging of said engine cylinder and to confine the flow of said intake and exhaust gases in substantially parallel paths in a plane extending substantially parallel to the piston top face as same are being respectively introduced and exhausted from said engine cylinder with a minimum of intermingling of said intake and exhaust gases, said intake ports located to either side of said exhaust port and having lower port edges aligned substantially in the same engine transverse plane extending parallel to the piston top face and normal to the cylinder axis containing the lower port edge of the exhaust port, said intake ports having a lesser height than the exhaust port and thereby providing for an earlier opening of said exhaust port by said piston to promote the aforesaid loop scavenging of said engine cylinder.

5. An induction system for a two-stroke cycle internal combustion engine having a cylinder and a substantially flat top piston operable in said cylinder, intake and exhaust means for said cylinder and comprising closely adjacent intake and exhaust ports located on the same side of said engine cylinder and intake and exhaust conduits respectively connected with said ports and lying in a common plane extending substantially parallel to the piston top face and normal to the cylinder axis, said intake and exhaust ports constructed and arranged in cooperative relation with said conduits to induce substantially parallel flow of said intake and exhaust gases with a minimum of intermingling of said intake and exhaust gases in a plane parallel to the piston top face and substantially coinciding with plane of said conduits as same are being respectively introduced and exhausted from said engine cylinder, the intake conduit of said engine induction system having branched parallel conducting portions terminating in a pair of intake ports located on each side of said exhaust port and closely adjacent thereto.

6. An induction system for a two-stroke cycle internal combustion engine having a cylinder and a piston operable in said cylinder, intake and exhaust means for said cylinder and comprising closely adjacent intake and exhaust ports located on the same side of said engine cylinder, said intake and exhaust ports constructed and arranged to induce substantially parallel flow of said intake and exhaust gases in a plane extending substantially normal to the cylinder axis with a minimum of intermingling of said intake and exhaust gases as same are being respectively introduced and exhausted from said engine cylinder, said engine induction system including an intake conduit having branched parallel conducting portions surrounding the exhaust passage and terminating in a pair of intake ports located on each side of said exhaust port, said branched portions lying in a common plane extending substantially normal to the cylinder axis.

7. An induction system for a two-stroke cycle internal combustion engine having a cylinder and a piston operable in said cylinder, intake and exhaust means for said cylinder and comprising closely adjacent intake and exhaust ports located on the same side of said engine cylinder, said intake and exhaust ports constructed and arranged to induce substantially parallel flow of said intake and exhaust gases with a minimum of intermingling of said intake and exhaust gases as same are being respectively introduced and exhausted from said engine cylinder, said engine induction system lying in a plane extending substantially normal to the cylinder axis and including an intake conduit having branched conducting portions surrounding the exhaust passage and terminating in a pair of intake ports located on each side of said exhaust port, and fuel splitting means constructed in the wall separating the intake and exhaust conduits and located in alignment with the center axis of said main intake conduit and positioned intermediate said branched conducting portions to substantially uniformly distribute the fuel to said branch conducting portions.

THOMAS JACKSON.